United States Patent [19]

Merz

[11] 4,157,530
[45] Jun. 5, 1979

[54] AUTOMATIC TIRE PRESSURE MONITORING SYSTEM

[76] Inventor: Ernest J. Merz, 745 Old State Rd., Berwyn, Pa. 19312

[21] Appl. No.: 641,817

[22] Filed: Dec. 18, 1975

[51] Int. Cl.² ............................................. B60C 23/04
[52] U.S. Cl. ................................... 340/58; 73/146.5; 200/61.25
[58] Field of Search ............... 340/58, 267 R, 282, 340/679, 686; 200/61.22, 61.25; 73/146.3, 146.5, 146.8, 505, DIG. 2

[56] References Cited

U.S. PATENT DOCUMENTS

| | | | |
|---|---|---|---|
| 3,614,732 | 10/1971 | Lejeune | 340/58 |
| 3,665,387 | 5/1972 | Enabnit | 340/58 |
| 3,781,787 | 12/1973 | Sugiyama | 340/58 |
| 3,828,309 | 8/1974 | Yamasaki et al. | 340/58 |
| 3,832,681 | 8/1974 | Kaida et al. | 340/58 |
| 3,890,595 | 6/1975 | Barabino | 340/58 |
| 3,924,257 | 12/1975 | Roberts | 340/282 |
| 3,978,448 | 8/1976 | Vago | 340/58 |

FOREIGN PATENT DOCUMENTS 1377749 12/1974 United Kingdom ............... 340/58

Primary Examiner—John W. Caldwell, Sr.
Assistant Examiner—Joseph E. Nowicki
Attorney, Agent, or Firm—Woodcock, Washburn, Kurtz & Mackiewicz

[57] ABSTRACT

A pressure sensor connected to tire pressure and using a rolling diaphragm in an actuator having two effective operating diameters to provide a dead band corresponding to satisfactory pressure range adjusts a magnetic signal generating unit also mounted on the rotating wheel and having a ferro-magnetic shield to avoid effects of nearby magnetic materials on the field of a permanent magnet which is permitted to pass through windows in the shield to sweep selectively over two position biased magnetic sensors mounted on the vehicle chassis. The different signals of the two magnetic sensors are processed by electronics to reconstruct the pressure sensor position and display corresponding tire condition to the vehicle operator.

29 Claims, 14 Drawing Figures

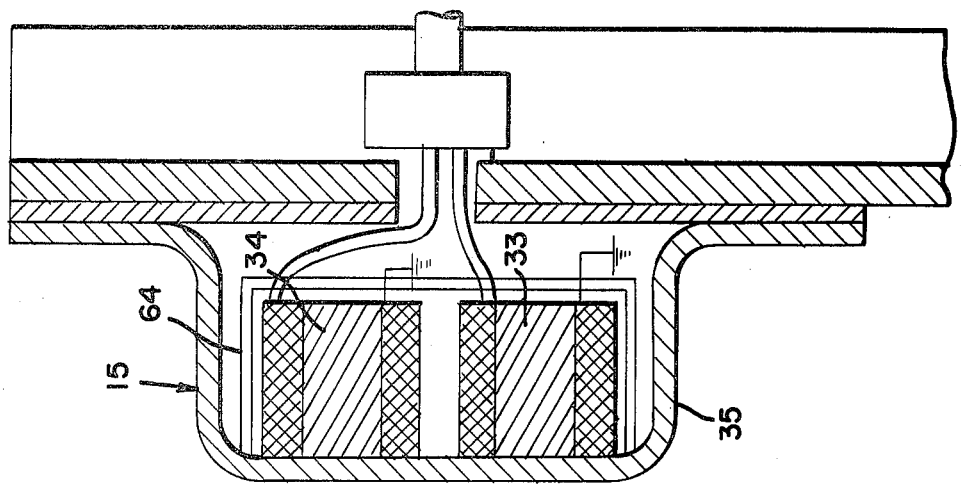
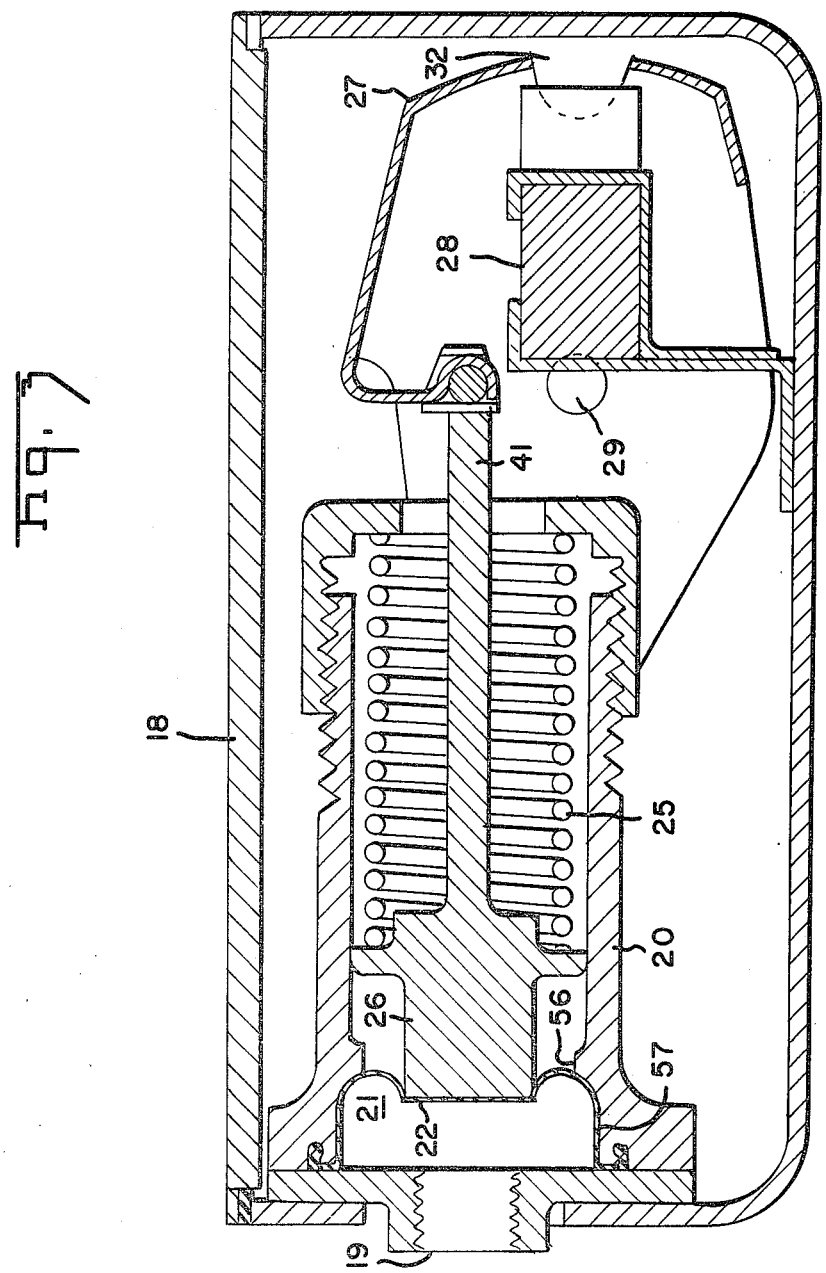

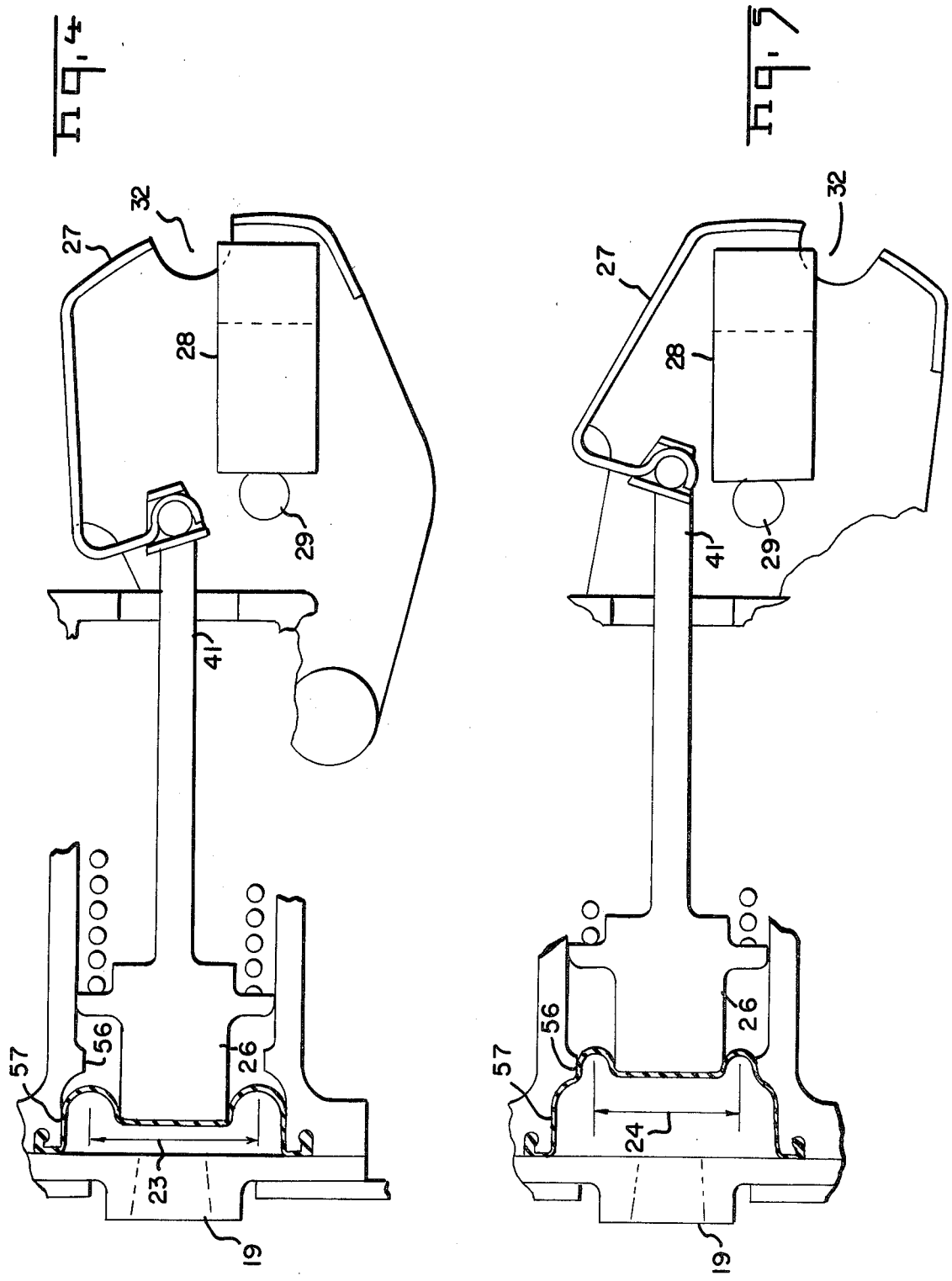

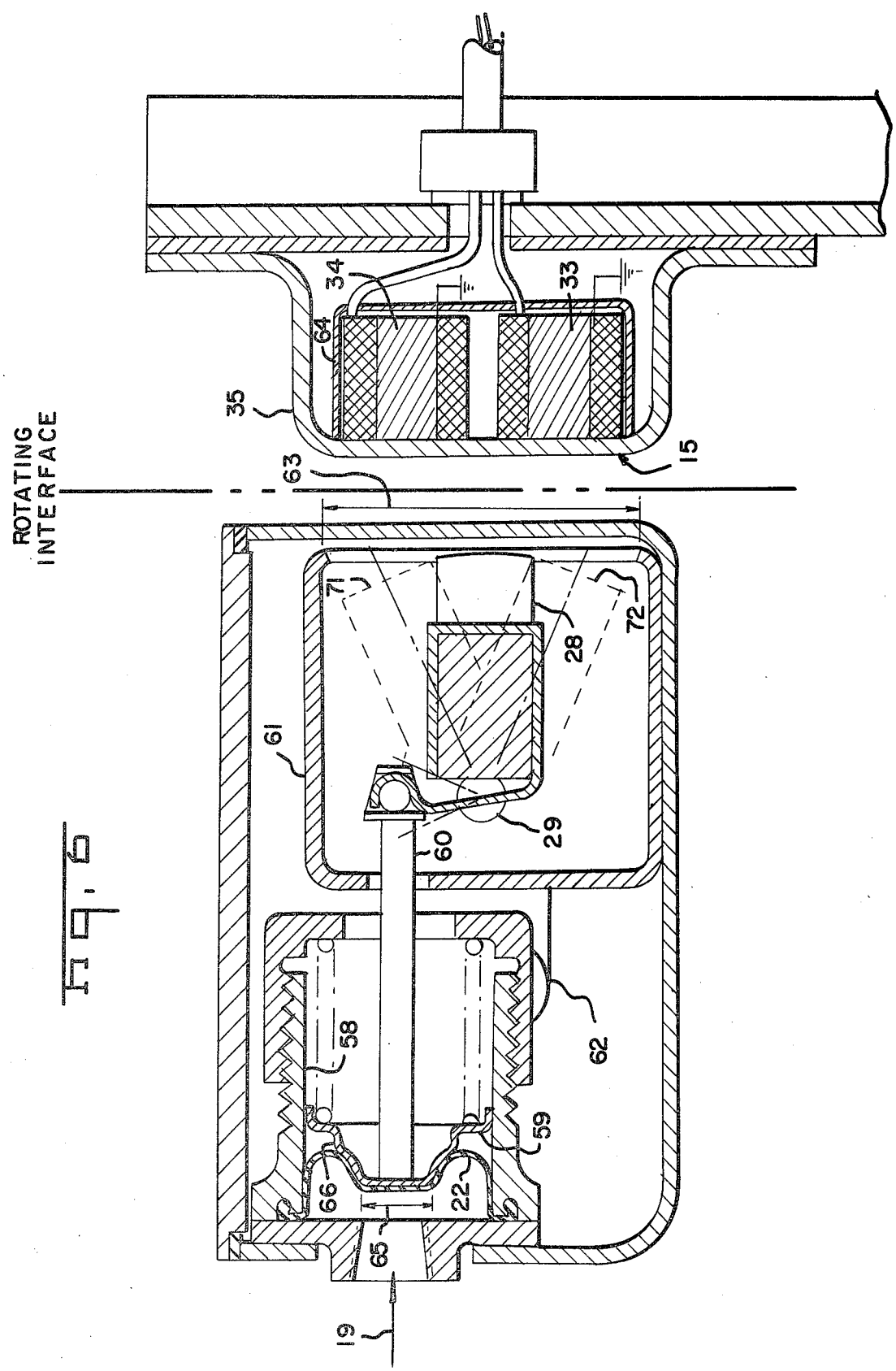

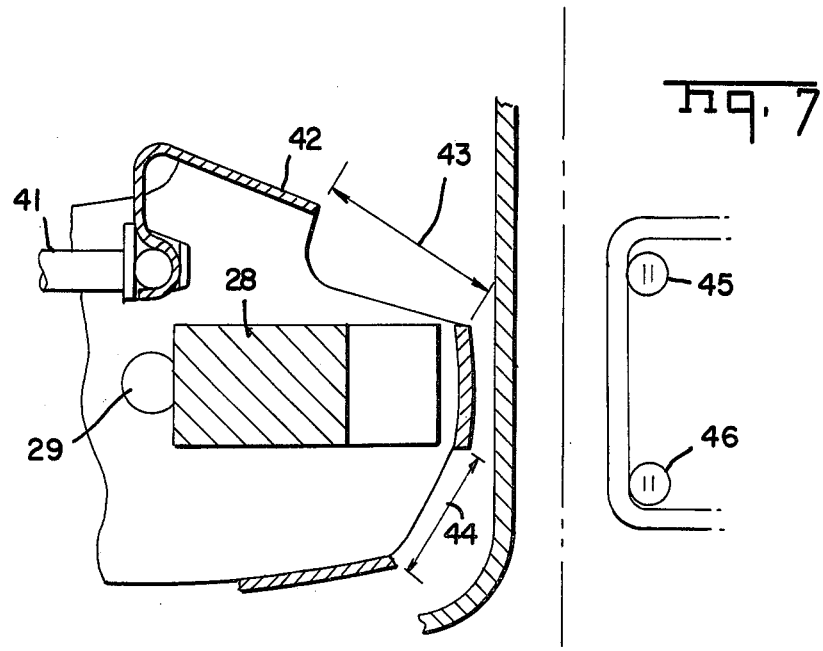
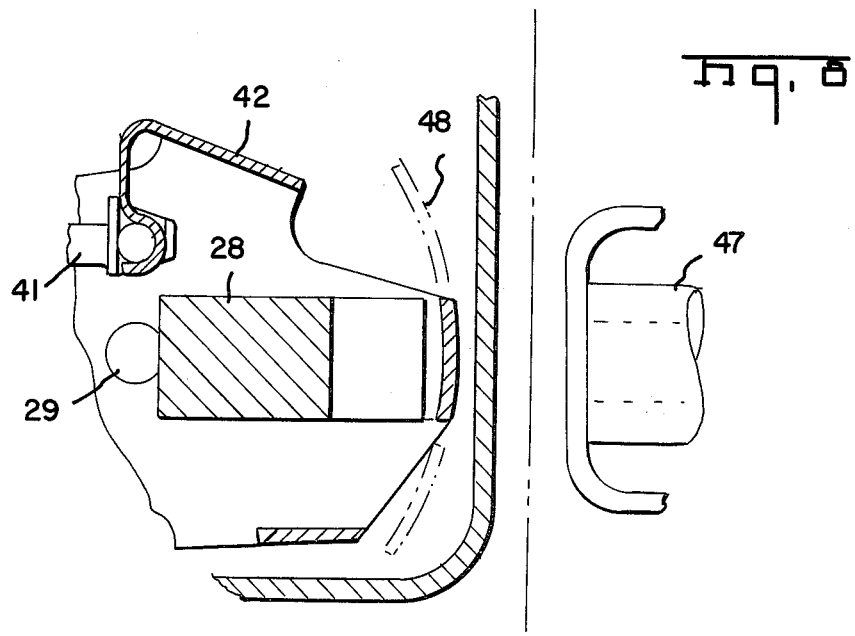

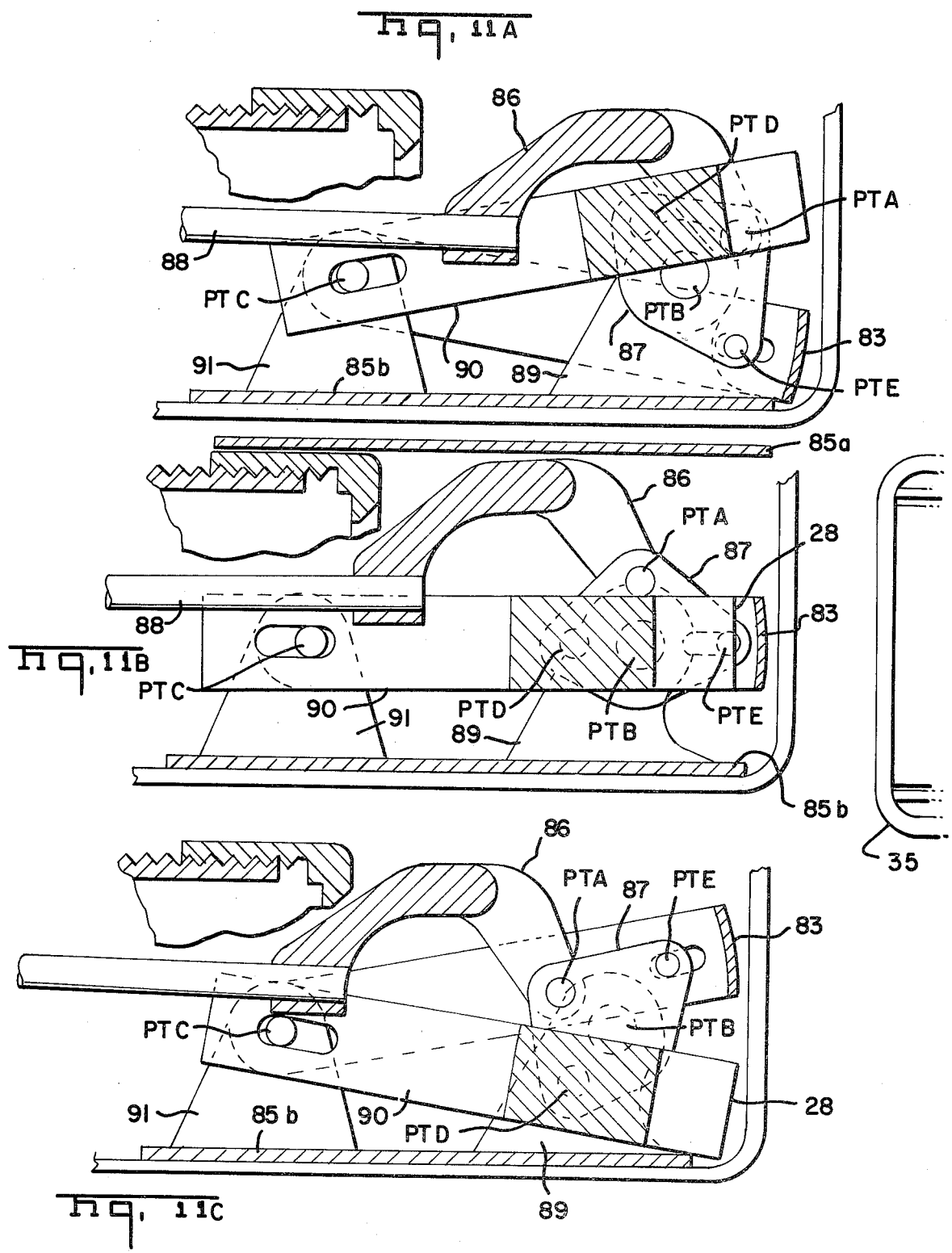

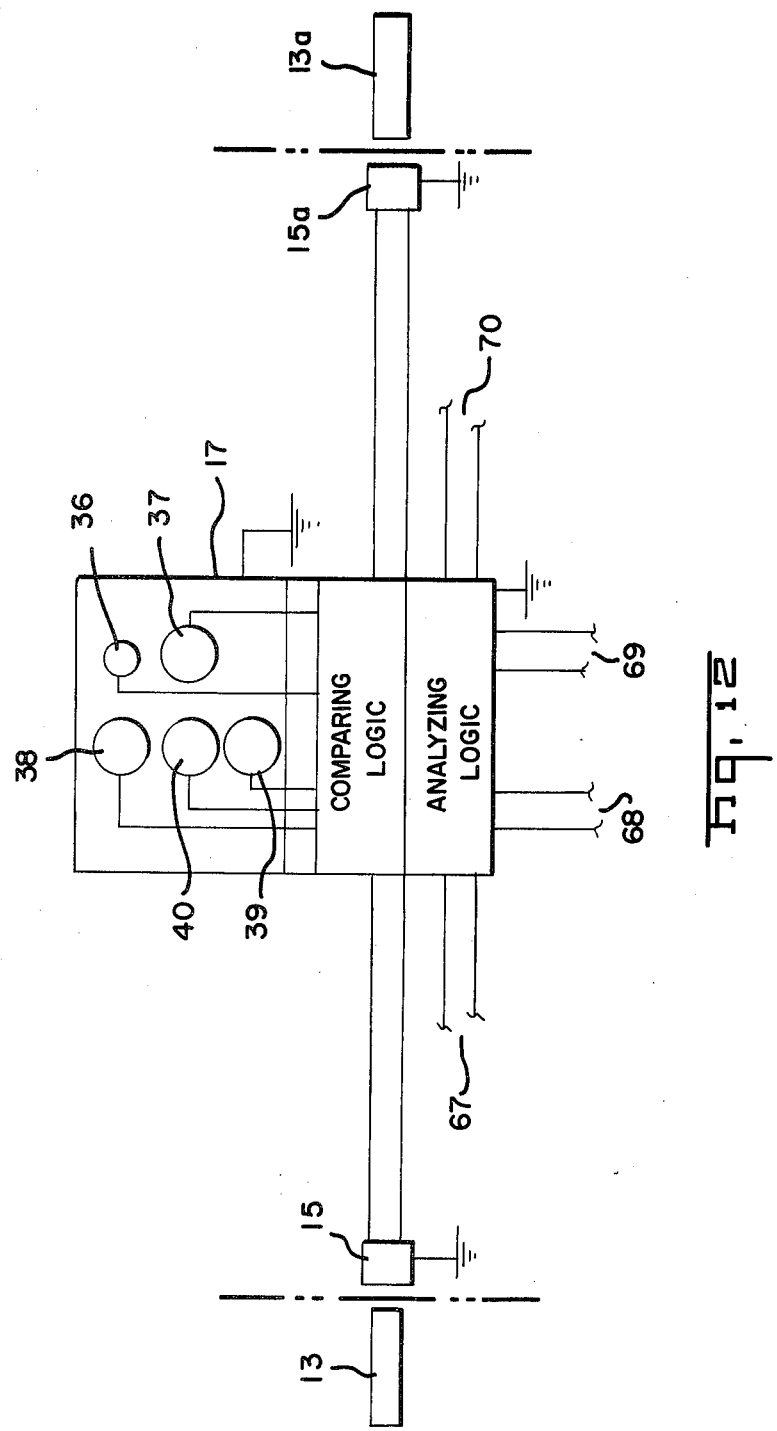

AUTOMATIC TIRE PRESSURE MONITORING SYSTEM

BACKGROUND OF THE INVENTION

This invention provides a system for monitoring the condition of a device such as a pneumatic tire mounted on a rotating axis and providing indications of both satisfactory and unsatisfactory conditions at the operator's control station. In a pneumatic tire/vehicle system, it will respond to both excessive high tire pressure and dangerously low pressure to provide a warning signal to the vehicle operator, and will respond to a range of satisfactory pressures by providing an indication of satisfactory condition to the vehicle operator.

The value of maintaining proper inflation pressure in vehicle pneumatic tires has been well demonstrated both in vehicle safety and in minimizing tire wear. Warning systems in the prior art have frequently addressed themselves to providing a signal only in case of low tire pressure and do not respond to excessive high pressure to indicate an unsatisfactory signal. Such systems are shown in Yamasaki—U.S. Pat. No. 3,828,309 and Kaida—U.S. Pat. No. 3,832,681. Excessive high pressure is also dangerous, particularly when one tire of a pair has excessive pressure, and it also leads to uneven tread wear and economic loss. In previous systems for indicating both high and low pressures, such as Ainsworth—U.S. Pat. No. 2,629,086, double air pressure chambers have been used leading to great complexity and fabrication cost.

A typical pneumatic tire is designed to be inflated to a given pressure when cold and to operate satisfactorily at a higher pressure when the tire and the air it contains are heated by normal road operation. Hence, a range of satisfactory pressures must be accommodated in order for a pressure monitoring system to have maximum flexibility. When the pressure rises above or falls below that range, it should immediately provide an indication of malfunction and the type of malfunction (high or low) to the vehicle operator.

Many situations such as the checkout of an aircraft before flight require a positive signal that the tire condition is normal as well as a warning signal that the condition is abnormal. This ensures that a failure in the monitoring system such as a lack of warning cannot be misconstrued as an indication of system readiness. Therefore, it is most effective to provide a positive signal to the vehicle operator so that the driver of a truck, for instance, may be assured of the tire condition before leaving the freight terminal and proceeding onto a highway. The driver of a large truck often cannot determine the condition of his tires by the reaction of the vehicle and may proceed to the point where a soft tire becomes overheated and is completely destroyed. Similarly, on dual wheels the other tire installed with a malfunctioning tire may be overloaded and destroyed. This economic loss is a significant part of tire expense and may be alleviated by an adequate warning system. If a front tire on a truck is operated at low pressure and a blowout occurs, the consequent loss of control may lead to a very serious accident and loss of life, particularly on a busy high-speed highway.

Certain other systems such as in the Lejeune U.S. Pat. No. 3,638,180, use a manually reset mechanism to indicate an abnormal condition. The system of the Kaida U.S. Pat. No. 3,832,681, uses a mechanism operated by centrifugal force and therefore is dependent on vehicle speed for successful operation. To reduce labor and the possibility of human error, the monitoring system should be completely automatic, and immediately reversible with only the pneumatic pressure as an input. It should operate reliably and consistently from a speed of a few miles per hour up to the top speed at which the vehicle is to operate. Other systems such as in Yamasaki U.S. Pat. No. 3,828,309, do not account for the centrifugal forces which will be present in a rapidly rotating body since they utilize actuators operating in a radial direction with respect to the axis of rotation. The centrifugal force on a one pound object six inches from the center of the wheel of a passenger car traveling at 60 mph is over 100 pounds. These forces and the friction that they cause must be accounted for in order to provide a reliable indication independent of vehicle speed. Hence, all operating mechanisms should be dynamically balanced and should provide enough operating force to overcome friction inherent in a rapidly rotating body.

Most systems utilizing a magnetic field projected from the rotating wheel to a sensor on the vehicle chassis have not accounted for the influence of nearby ferrous materials on the magnetic field. Almost all vehicles use large quantities of steel and iron for the wheels, tire rims, brake drums, wheel hubs, axles, brakes, springs and other chassis parts. Any of these parts which are near a magnet will tend to distort and divert the magnetic field from its normal condition. Therefore, previous art such as the magnetic sensors of Ainsworth—U.S. Pat. No. 2,629,086, Cole—U.S. Pat. No. 2,057,556, Lejeune—U.S. Pat. No. 3,638,180, which have not accounted for this type of interference due to the ferromagnetic environment, may have been subject to inaccuracies and variations depending on the specific conditions where they were installed. Other external magnetic influences, although usually quite small, might conceivably influence a magnetic sensor if proper shielding is not provided. In order for a magnetic signal device to be useful and accurate on many different vehicles, means must be provided to shield both the magnetic signal generating unit and the receiving magnetic sensors from the effects of adjacent ferrous components and random magnetic influences.

In view of the above, it is the primary object of this invention to provide a fully automatic tire pressure monitoring system which will provide to the vehicle operator a positive indication of tire satisfactory condition as well as a warning of either excessive high pressure or low pressure.

It is another of this invention to provide a tire monitoring system having a substantially broad range of satisfactory tire pressures within which no signal of apparent malfunction is transmitted to the vehicle operator. This range or dead band of pressure should be set to coincide with the high and low pressure operating limits of the tire being monitored.

It is another object of this invention to provide a tire monitoring system utilizing a magnetic signal transfer which is shielded from the effects of adjacent ferrous components and random magnetic influences in order to permit broad application on different vehicles.

It is another object to provide a pressure sensing device which will provide both high and low pressure signals with a single action pneumatic chamber and actuator.

It is another object to provide a tire pressure monitoring system which is dynamically balanced under centrifugal forces.

It is another object to provide a tire pressure monitoring system which is independent of vehicle speed.

It is another object to provide the vehicle operator with an indication of marginal high pressure and marginal low pressure as well as satisfactory pressure, unsafe high pressure and unsafe low pressure.

It is another object to provide a means for presenting a continuously variable indication of tire pressure to the vehicle operator.

SUMMARY OF THE INVENTION

This invention makes use of a permanent magnet mounted on the rotating wheel to give a signal to a plurality of magnetic sensors on the non-rotating part of the machine. The magnetic field of the magnet is guided by changing the position and/or direction of the magnet and is shielded from external interference by use of a shield of ferrous material which may be static, moving or co-mounted with the magnet. The shield is provided with cutouts or windows at appropriate locations to permit the magnetic field to fall on certain sensors under the conditions when it is desired to sense specified events or conditions while preventing variations in the magnetic field due to external ferrous components.

In a tire pressure monitoring system, a pressure responsive means is provided and consists of a rolling diaphragm acting on a sliding piston which is spring biased operating in a cylinder of two diameters. The diaphragm operates in the larger diameter when the tire pressure is below the normal operating range and provides a motion to the magnetic field adjustment means. The diaphragm in the large cylinder has an effective diameter on which pressure acts equal to one half of the sum of the piston diameter plus the cylinder diameter. This provides a larger area when operating in the large diameter cylinder than when operating in the small cylinder which has a smaller effective diameter on which pressure acts. This change in effective diameter on which pressure acts permits a "dead band" or discontinuity in the pressure/stroke curve of the pressure sensor which is set to correspond to the satisfactory operating range of the tire being monitored. This air pressure at the low end of the range over the large effective area will exactly balance the spring force and prevent the piston from moving toward the large end of the cylinder. Any reduction in tire pressure will permit the spring to overpower the air pressure and force the piston toward the large end of the cylinder thereby changing the magnetic field generating means and resulting in a changed signal to the sensors on the non-rotating part of the vehicle. In like fashion, the air pressure at the high end of the satisfactory operating range over the effective area of the smaller diameter will exactly balance the same spring force at the "dead band" position of the diaphragm and piston. A higher tire pressure will overpower the spring force resulting in motion toward the small diameter of the cylinder and the magnet. This motion will cause a change in the magnetic field on the sensors on the non-rotating portion of the system. The provision of this "dead band" over the satisfactory operating range permits the use of a much reduced stroke and reduced size of the pressure sensor and a more rapid and accurate action of the magnetic field adjustment means when pressure is outside that range. It also provides a single chamber pressure sensor to provide both low and high pressure signals.

The same dead band may be provided by a cylinder with a single diameter in which a piston having two diameters operates under the pressure loading of a rolling diaphragm to provide two effective diameters.

The strength of the magnetic field on the magnetic sensors of the non-rotating portion of the vehicle may be changed by moving the magnet or by moving the shield or both so that the magnetic field changes location and direction with respect to the magnetic sensors. For the satisfactory pressure condition an open window is arranged to expose equally two magnetic sensors mounted on the non-rotating portion of the vehicle so that one is radially further from the center of rotation than the other but they both are located on the same radial line. Both sensors will then receive the same intensity magnetic force field (Gauss) and will transmit an equal signal to the electronic logic which then causes a "system ready" signal to be displayed to the vehicle operator. Any short or break in the wiring will be displayed as a malfunction and the vehicle operator will be alerted.

When the pressure sensor moves the magnet or the window of the shield in one direction due to an excessively high pressure the lower magnetic sensor (closer to the axis of rotation) will be exposed to a stronger magnetic field (higher Gauss) than the other magnetic sensor and will send a stronger signal to the electronic logic which will cause the display of a high pressure signal to the vehicle operator. Conversely, a low pressure in the pressure sensors moves the magnet or the window so that the other magnetic sensor (farther from the axis of rotation) is exposed to a stronger magnetic field causing it to yield the stronger signal which is interpreted by the logic as a low pressure signal.

The magnetic sensor may be a coil of wire on a soft iron core, a reed switch or other magnetic switch or a solid state device such as a transistor which is sensitive to a magnetic flux. The coil or solid state device which produces an electromotive force of magnitude dependent on the strength of the magnetic field is an ideal sensor since it will yield a continuously variable signal rather than an off-on response such as a switch. Using a coil exposed to a moving magnetic field the voltage generated is proportional to the strength of the field and to the speed with which it moves across the coil as well as to the coil characteristics. By comparing the voltage generated in the outer coil (further from the axis of rotation) with that generated in the inner coil (closer to the axis of rotation) the position of the magnetic signal generating unit can be accurately determined for each revolution of the wheel by use of solid state electronics using integrated circuits. The logic can then be calibrated to display the corresponding information to the vehicle operator. By comparing the voltages of the two sensors on the same revolution, the effect of rotational speeds is canceled. A continuously varying display may be used since the signal from the two coils will vary with the position of the magnetic signal generating unit as operated by the pressure sensor. In case of failure at any time in either coil sensor circuit, an indication of gross malfunction will alert the vehicle operator.

The display panel at the vehicle operator's station may provide a simple red warning light which indicates malfunction or it may be a panel which includes a light indicating satisfactory pressure, a light to indicate the tire being monitored, a malfunction warning light, an indicator to show high or low pressure and a switch to cycle the checking sequence of the monitor. A sophisticated system as for an aircraft may have provisions on the display to show marginal malfunction as well as the satisfactory range and gross malfunction. If desirable, a continuous display of pressure calibrated in pounds per square inch can be used with colored zones to indicate safe, marginal and unsafe conditions of tire pressure.

DESCRIPTION OF THE DRAWINGS

The primary features of the invention may be better understood by examination of the accompanying drawings in which:

FIG. 3 is a sectional view of the unit of FIG. 2 taken in a plane which includes the axis of rotation of the vehicle wheel and showing the pressure sensor and magnetic shield in the position which corresponds to satisfactory tire pressure;

FIG. 4 is a partial repeat of FIG. 3 with the pressure sensor and magnetic shield in the position which corresponds to low tire pressure;

FIG. 5 is a partial repeat of FIG. 3 showing the pressure sensor and magnetic shield in the position corresponding to high tire pressure;

FIG. 6 is a sectional view similar to FIG. 3 of a simplified embodiment of the magnetic signal generating unit utilizing a static shield and a two-diameter piston in the pressure sensor;

FIG. 8 is a modification of FIG. 7 utilizing a single magnetic sensor on the non-rotating portion of the vehicle;

FIG. 9 is a view similar to FIG. 3 of a reduced size pressure sensor and signal generator unit for application to confined installations such as within the brake drum diameter of a wheel;

FIGS. 11A, 11B and 11C are views in three positions of a version of the magnetic signal generation unit which provides translation and rotation of the magnet and part of the magnetic shield; and FIG. 12 is a partial wiring schematic of the sensor logic and display components.

DESCRIPTION OF THE PREFERRED EMBODIMENTS

The embodiments shown in the figures are explained with their advantages and applications. Other modifications which are too numerous to present may be utilized based on the features discussed and will perform the same functions. The embodiments shown are intended primarily for tire pressure monitoring but may be used for monitoring fluid pressure on any rotating wheel such as a turbine, or for monitoring other conditions or events, as on a helicopter rotor.

The embodiments delineated principally in FIGS. 1-6 show a monitoring system for a vehicle equipped with dual tires as on the rear wheels of large trucks. For the front wheels of such trucks and for other vehicles with single tires the same apparatus would be used except that only one pressure sensor and signal generator unit per wheel would be necessary. In this case a balance weight must be attached at the opposite side of the wheel to prevent dynamic imbalance.

Figure 1:
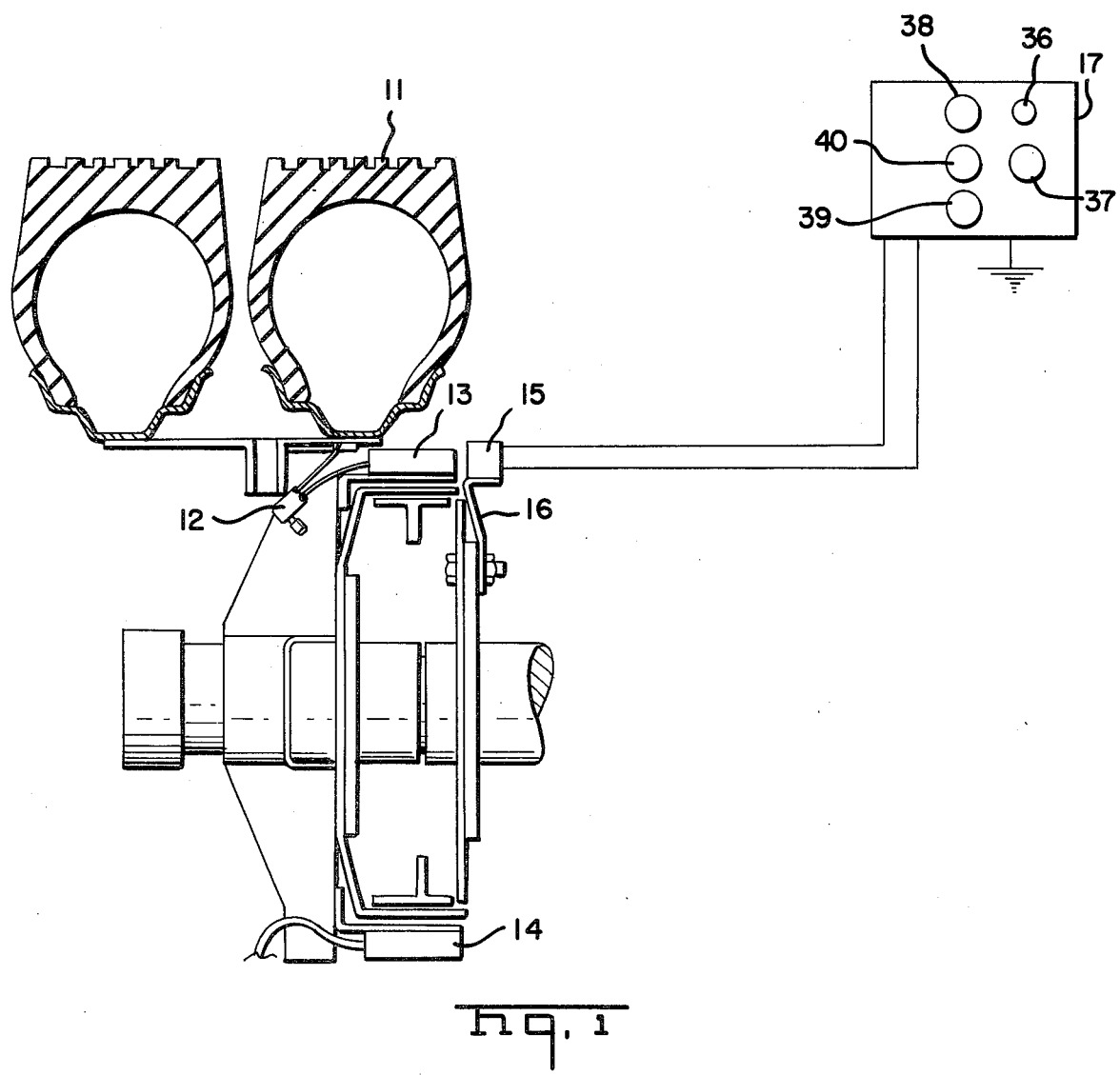
FIG. 1 is a partial sectional and diagrammatic view of a dual wheel type vehicle showing the general location of the key monitoring system components.
Figure 2:
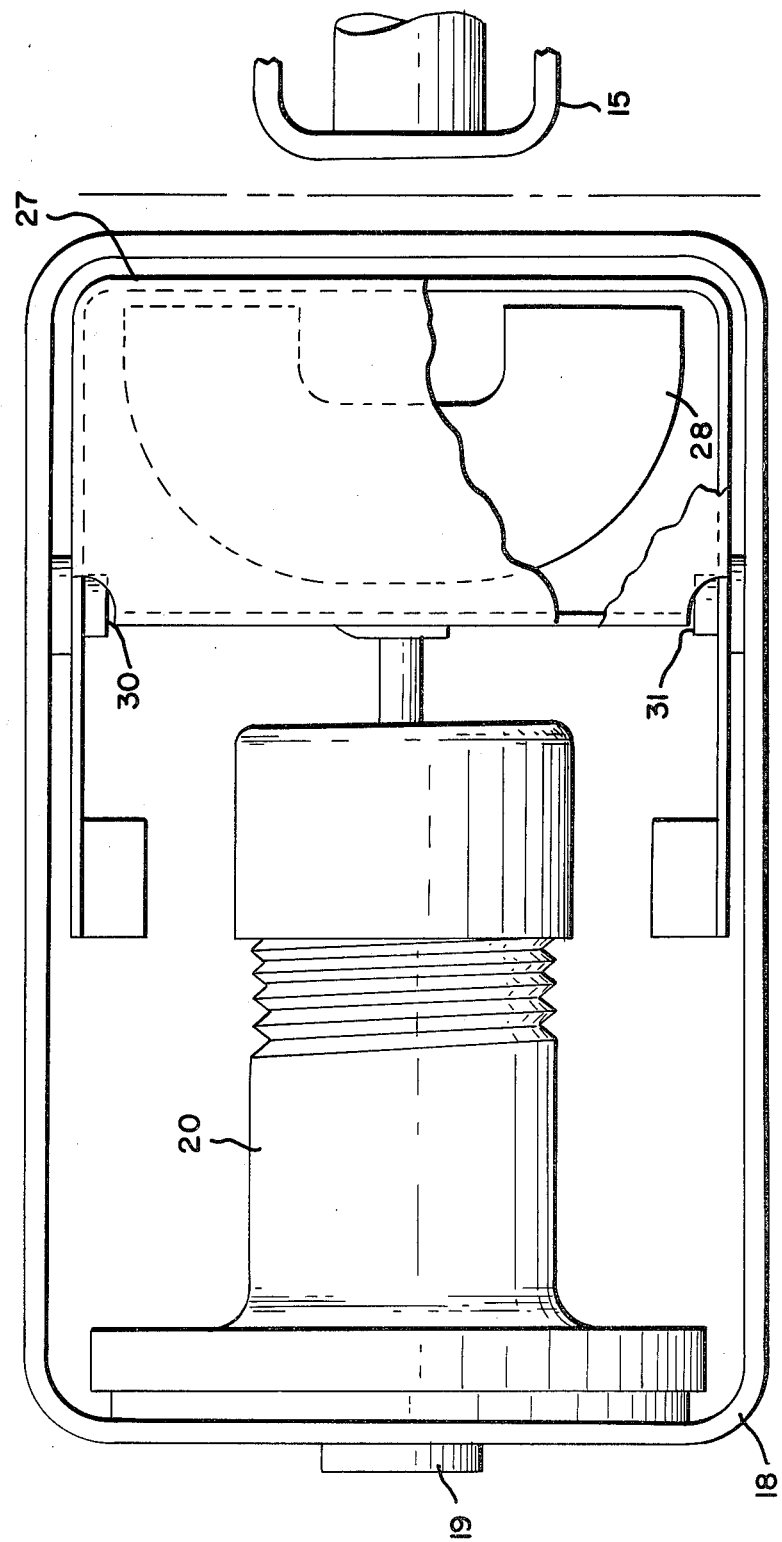
FIG. 2 is a plan view of an embodiment of the pressure sensing and magnetic signal generating unit utilizing a static magnet and a two-diameter cylinder in the pressure sensor.

The general layout of the system in FIG. 1 shows the tire 11 connected by its regular valve stem to an adapter unit 12 having a secondary valve cap and core valve for use in normal inflation of the tire. The valve core is removed from the regular stem of the inner tube (or tubeless tire stem) so that a direct passage is open from the tire interior to the pressure sensor of the monitoring system. For use with a wheel employing a tubeless tire the adapter unit may be combined with the regular inflation stem for purposes of economy. The adapter unit line going to the pressure sensor may be a flexible hose of typical fabric and rubber construction suitable for the tire pressure involved or may be a metal tube formed to the length and shape suitable for the specific wheel and tire being outfitted.

The pressure sensor and signal generator unit 13 (sometimes referred to as the pressure unit) is shown located on a bracket attached to the vehicle wheel and in the radial space between the tire and the brake drum. If this volume is not available as on some vehicles, the pressure unit may be located within the radius of the brake drum or any other location adjacent to a non-rotating portion of the vehicle which is suitable for mounting the magnetic sensor. Penetration of the brake drum or attachement of the pressure unit directly to the drum should normally be avoided in order to minimize modifications to existing designs and costs attendant thereto. A second pressure unit 14 for the other tire is located on the opposite side (180° away) of the wheel where it balances the first unit. As either unit rotates past the dual magnetic sensor unit on the non-rotating portion of the vehicle a signal will be generated and relayed to the display unit. It is not important to have two separate magnetic sensor units since isolation of a malfunction to one of two dual tires will provide adequate information for rapid corrective action. The electronic logic will be used to yield a malfunction signal if either of the two pressure units provides a malfunction signal.

The magnetic sensor unit 15 is installed on a bracket 16 attached to the non-rotating portion of the vehicle axle or brake support plate and is adjusted to provide a nominal clearance from the pressure unit. A clearance of ¼ inch is adequate for most vehicles but may be increased to one inch if necessary. A unique mounting bracket may be provided for the pressure unit and for the magnetic sensor for each model vehicle depending on configuration. In this manner the pressure unit and magnetic sensor unit may be used on many different vehicles and adapted to high production techniques. The wiring in the magnetic sensor unit is provided with a disconnect suitable for environmental protection so that the main wiring to the logic and display panel 17 may be part of the vehicle wiring harness. The functioning of the logic and display unit will be discussed after a full explanation of the other components.

A typical embodiment of a pressure sensor and signal generator unit based on a rolling diaphragm in a cylinder of two diameters is shown in detail in FIGS. 2-5. The preferred embodiment shown in FIG. 6 uses a rolling diaphragm in contact with a piston of two effective diameters to obtain an effect equivalent to the cylinder of two diameters described below. That embodiment, shown in FIG. 6, which may be preferred since it uses a static magnetic shield, is more fully described later.

The embodiment shown in FIGS. 2-5 uses a pressure sensor and signal generator unit housed in a case 18 which, preferably, is hermetically sealed for protection from the adverse environment. The case or at least the end toward the magnetic sensor is fabricated of a non-ferrous metal such as brass or aluminum or of a high strength plastic. Other portions of the case or the mounting bracket may be fabricated of ferrous material to augment the shielding provided by the internal shield 27. If greater protection from physical damage is necessary, the mounting bracket can be configured to provide an external guard against debris and road hazards. Pressure from the tire is admitted through pressure inlet 19 at the outboard end of the pressure unit through the end cap of a pressure responsive pneumatic actuator 20.

The actuator 20 has a dual diameter cylindrical portion 21 in which a rolling diaphragm 22 operates. A rolling diaphragm has the natural characteristic of an effective diameter equal to one-half the sum of the piston diameter plus the cylinder diameter. This characteristic is utilized in the pressure sensor which has two different cylinder diameters 56 and 57 in the diaphragm area, to provide a step in the pressure/stroke curve or a dead band in the operation as pressure is changed. That is, when the piston and diaphragm are operating in the large diameter 57 of the cylinder (see FIG. 4) the effective diameter 23 (and effective area) is greater than when the piston and diaphragm are operating in the small diameter 56 (see FIG. 5). By proper analysis of the pressures involved and of the spring rate of the spring 25 biasing the piston 26 toward the pressure source the dead band of the sensor may be set to coincide with the upper and lower limits of the satisfactory range for tire pressure. Then the pressure at the lower limit times the effective area 23 in the larger cylinder 57 will exactly balance the spring force with the diaphragm 22 at the juncture of the two diameters (see FIG. 3). Any reduction in pressure will permit the spring force to overpower the pressure and force the piston toward the pressure inlet end of the actuator. At the same point, the pressure at the high limit times the effective area in the small cylinder will exactly balance the same spring force. Any greater pressure will overpower the spring force and cause a rapid motion of piston 26 and piston rod 41 away from the source of pressure. The approximate values of stroke, pressure, effective diameter, effective area, force due to air pressure, spring force and the unbalanced force available to operate the magnetic shield 27 are given in Table I for a representative design as illustrated in FIGS. 1-6.

TABLE I
REPRESENTATIVE PRESSURE SENSOR PARAMETERS

| | | | | |
|---|---|---|---|---|
| Stoke, Inches From Inlet End | 0 | .195 | .195 | .390 |
| Tire Pressure, psi | 50 | 60 | 80 | 90 |
| Effective Diameter, Inches | .62 | .62 | .537 | .537 |
| Effective Area, Square Inches | .302 | .302 | .226 | .226 |
| Force Due To Air Pressure, lbs. | 15.1 | 18.11 | 18.11 | 20.38 |
| Spring Force, lbs. | 16.61 | 18.11 | 18.11 | 19.61 |
| Force Toward Inlet End Of Actuator, lbs. | 1.51 | 0 | 0 | −.77 |

The tire pressure of 60 psi or of 80 psi will be balanced by the same spring force of 18.11 lbs. because of the change in effective area at the juncture of the two diameters. In this case, the 60 psi corresponds to the low pressure limit and 80 psi to the high pressure limit for the tire being monitored. The 50 psi at zero stroke and 90 psi at maximum stroke are not intended to indicate a required pressure change since the strokes and operating forces shown are much greater than needed. The actual pressure change required to cause a malfunction signal will not be over 2 psi after calibration of the actuator with the magnetic sensor.

The apparatus for obtaining a dead band for the pressure sensor as described above is very important from several aspects: (a) it permits use of a shorter spring and reduced size pressure unit; (b) it permits the design of a compact magnetic signal generating unit since no travel takes place in the dead band of pressure change; (c) it permits a more accurate monitoring system since the magnetic signal generating unit moves rapidly to change the signal when pressure goes outside the "dead" area; (d) it provides an accurate method to indicate a broad range of satisfactory pressure without interpretation by the vehicle operator.

The pressure sensor shown in FIG. 6 uses a cylinder with a single internal diameter 58 in which a piston 59 operates in contact with a rolling diaphragm 22 that has the same operation as described above. In this case, the piston 59 has a small diameter 65 which acts to yield a small effective diameter and area when the piston is moved toward the permanent magnet 28. Similarly, the large piston diameter 66 is effective on the diaphragm 22 when the piston is moved toward the pressure inlet yielding a larger effective diameter and area. This provides the same dead band operation described above to provide a range of satisfactory pressure which does not change the magnetic signal transmitted by the signal generating unit. The pressure sensor in FIG. 6 may be preferred since it has a slightly smaller diameter and may be lower in cost than that shown in FIG. 3. Additionally, different pressures and ranges of pressure for different vehicles may be accommodated by changing the piston operating diameters slightly and by substitution of a modified spring as may be required. By this technique, all of the other basic components can be used on most conventional on-the-road vehicles.

The piston 59 operates the permanent magnet 28 by means of the piston rod 60 which operates through a hole in the static magnetic shield 61. This is the preferred embodiment of the magnetic shield since it remains fixed and may be visualized as a simple box with five closed sides and one open side or window 63. The window is located directly opposite the magnetic sensor on the non-rotating part of the vehicle. The shield is fabricated of steel or other ferromagnetic material which is impervious to a magnetic field whereby any material outside the five shielded sides of the permanent magnet can have no influence on the magnet or its field. The sixth or window side is in direct opposition to the magnetic sensor 15 at the time of sensing; the sensor is also protected by a ferromagnetic shield 64 on five sides from other magnetic materials or random magnetism. This provides the maximum possible shielding for the magnetic signal generator and magnetic sensor thereby minimizing inaccuracies and variation from one type vehicle to another.

The permanent magnet 28 is hinged on pivot 29 to operate from position 71 which corresponds to low tire pressure to position 72 which corresponds to high tire pressure. When the magnet is in the mid-position as shown by solid lines in FIG. 6, it projects an equal magnetic flux on the two coils 33 and 34 in the magnetic sensor. The coils generate an equal voltage which is interpreted by the logic as a satisfactory pressure. At this position of the magnet the piston 59 of the actuator is within the "dead band" of the tire pressure. When tire pressure becomes too low, the piston moves toward the pressure source thereby rotating the magnet by means of the piston rod and the bracket on the magnet to position 71 where it is closer to coil 34 than to coil 33 causing a higher voltage to be generated in coil 34. The electronic logic compares the two signals, interprets this as a low pressure and displays a low pressure signal to the vehicle operator. When the tire pressure exceeds the dead band range the piston moves the magnet to position 72 which is closer to coil 33 than to coil 34. This causes a higher voltage to be generated in coil 33 which is interpreted by the logic as a high pressure signal and displayed to the vehicle operator. The permanent magnet 28 is connected to a counterbalance 62 outside of the magnetic shield 61 to minimize the effects of centrifugal force on the operation of the pressure sensor and magnetic signal generating unit.

In the embodiment shown in FIGS. 2-5, the permanent magnet 28 is a U-shaped magnet with the poles pointed in the direction of the magnetic sensor 15. It is rigidly supported by two clips from the case of the unit. The movable magnetic shield 27 formed of a ferromagnetic metal, is pivoted at 29 on a stud 30 and 31 at each side of the case. It completely shields the permanent magnet from external magnetic influences and prevents projection of its magnetic field except in the location of the opening or window 32 in the shield. Additional static shields may be used to shield five sides of the magnet as in FIG. 6. In FIG. 3, which depicts the normal pressure position, the two coils 33 and 34 in the magnetic sensor are exposed to an equal magnetic flux. The coils generate an equal voltage which is interpreted by the logic as a satisfactory pressure. When tire pressure becomes too low, the shield 27 moves to the position shown in FIG. 4 and the magnetic field on coil 33 is effectively blocked while coil 34 is more exposed. The voltages generated are now of much different magnitude and the logic interprets this signal as a low pressure condition. In FIG. 5, the high pressure condition, the exposure of the coils 33 and 34 to the magnetic field is reversed and the ratio of the voltages generated in the two coils is reversed. This is then interpreted by the logic as a high pressure signal.

When a coil is exposed to a moving magnetic field, a voltage is generated which is proportional to the strength of the magnetic field (Gauss) and to the speed of travel of the magnetic lines of force cutting across the coils. Therefore, an increase in the speed of the vehicle leads to a proportional increase in voltage with a constant magnetic field. The use of two magnetic coils and the comparison of their output voltages essentially eliminates the effect of vehicle speed on the monitoring system accuracy. The effects of hardware tolerances and variations in the gap between pressure unit and magnetic sensor are also greatly reduced.

The coils 33 and 34 are completely enclosed in a hermetically sealed case 35 with one terminal of each coil grounded and the other attached by an electrical connector to the wiring harness of the vehicle which leads to the logic and display panel. The coils are protected on five sides from the effects of ferrous materials or random magnetism by the shield 64.

The display panel shown in FIG. 1 provides a maximum of information in the format most useful to the vehicle driver. Each magnetic sensor is connected to the electronic logic by two wires, one for each magnetic coil with the other connection of each coil being grounded to the vehicle frame. The circuitry is designed so that as the vehicle is started in motion, the driver may operate the cycle switch 36 on the display panel 17 to start a check of the tires for satisfactory pressure. As each wheel is monitored for the correct balance between the voltages, its assigned number will appear in the wheel indicator 37 showing that the pressure is not abnormal and that the circuits are functioning. The cycle may be automatically repeated twice or any desired number of times to permit the driver to monitor all of the tires while giving attention to other driving functions. During this check cycle, the monitor is designed to stop in the cycle when any wheel registers a malfunction signal. The high pressure warning light 38 or low pressure warning light 39 is turned on and the number of the malfunctioning wheel remains on the wheel indicator until the driver stops or operates the cycle switch again to continue the check cycle. If neither a normal or an abnormal signal is received, the number of the wheel being monitored will also remain on the wheel indicator to identify the malfunctioning area for corrective action.

A normal pressure light 40 is provided to indicate normal tire pressure.

The checking cycle can also be started automatically with the initiation of engine starting and continued until two or more cycles are completed. When dual tires are used as shown with two pressure units and one magnetic sensor unit, the circuitry is arranged to obtain two "normal" signals from the sensor unit before indicating a normal pressure light for that wheel. At all times, when an abnormal signal is received at the logic, it takes precedence over a cycle check to display the malfunctioning wheel and type of malfunction. The system as described above will enable the driver to:

(a) determine if all monitor circuits to the wheels are checked out;
(b) obtain verification of satisfactory pressure in all tires;
(c) be informed immediately if a malfunction occurs and whether high or low pressure is indicated;
(d) determine the wheel on which the malfunctioning tire is located;
(e) make an informed decision regarding corrective action on the basis of the above data while considering his knowledge of the road, weather, road conditions, availability of maintenance and other factors.

Figure 7:
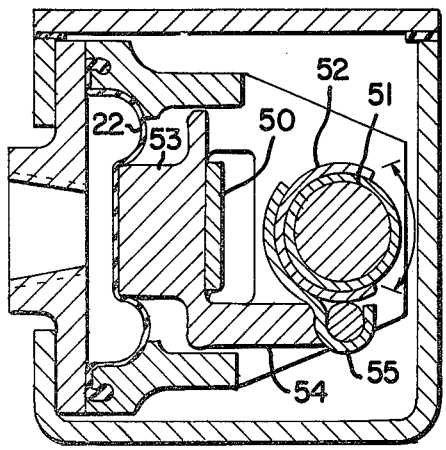
FIG. 7 is a partial modification of FIG. 3 with a magnetic shield that minimizes the magnetic field on the magnetic sensor in the satisfactory-pressure position.

An alternative embodiment shown in FIG. 7 provides a minimum magnetic field and, hence, a minimum signal to the magnetic sensors and the control logic when pressure is normal. The magnetic shield 42 as shown has a solid section between the face of poles of the magnet 28 and the magnetic sensors on the non-rotating part of the vehicle. Windows 43 and 44 are provided above and below that solid section to allow a stronger magnetic field to sweep over one or the other of the coils of the magnetic sensor. This generates a different voltage in the two coils which are then displayed as a low pressure or high pressure signal according to which coil has the higher voltage. In this case, since the minimum voltage available at normal pressure may not be sufficient for checkout of the coil circuits, that function can be performed by use of an electrical current directed from the vehicle power supply through a suitable resistor in the control logic.

In FIG. 7, magnetically operated reed switches 45 and 46 are shown as the magnetic sensors. These switches are actuated by the directional magnetic field produced by the magnet 28 and movable shield 42, but would not permit circuit checkout as noted above since the switches are normally open when not exposed to a magnetic field.

Anothr embodiment using a magnetic shield of the same configuration as shown in FIG. 7 but with only a single coil 47 in the magnetic sensor is shown in FIG. 8. In FIG. 8 the shield is shown in phantom in its low pressure position at 48 and in its high pressure position at 49. This simplified configuration is most suitable where lower cost is most important and accuracy may be reduced. Since a second magnetic sensor is not available for comparison of voltages generated, the effects of speed must be biased out in the control logic. This is accomplished in the logic by measuring the time interval between successive signals which correspond to a travel equal to the circumference of the wheel. All of the display functions noted previously could be performed except defining whether a malfunction signal was due to high or low pressure.

A single magnetic sensor may also be employed with a pressure sensor and signal generator of the type shown in FIG. 3 having a single window in position opposing the magnetic sensor when pressure is normal. This embodiment has the advantage of a strong magnetic signal for checkout monitoring of normal pressure. Any time the strong signal is not received, a warning signal is displayed indicating either abnormal tire pressure or a circuit problem.

A reduced length pressure sensor utilizing a flat spring 50 rather than a coil spring is shown in the embodiment illustrated in FIG. 9. The bar type magnet 51 supported by its magnetic shield 52 contributes to compact size and simplicity. In FIG. 9 the magnet and shield are supported by flanges extending from the housing of the pressure sensor. This piston 53, shown with the rolling diaphragm 22 in the normal pressure position, has a shaft 54 extending from its maximum diameter to a clip 55 for operation of the magnet and shield and adjustment of the magnetic signal.

Operation of the rolling diaphragm is essentially the same as that shown in FIG. 3 and described previously. The flat spring 50, shown in sectional view in FIG. 9, provides the means for obtaining a minimum length pressure sensor and signal generating unit. In this embodiment, the length of the unit is under 1.50 inches. The flat spring is of a length and thickness appropriate to develop the force and spring rate necessary to correlate with the range of operating pressure desired for the tire being monitored.

This embodiment of the pressure unit may be installed on the vehicle wheel outside the brake drum as shown in FIG. 1 or any alternative location. Because of its compact size, it is particularly well suited for restricted locations such as through a hole in the vertical surface of the brake drum. With the pressure unit in this location, the magnetic sensor is located inside of the brake drum and mounted adjacent to the brake shoes. This location is well suited to passenger cars and other small vehicles wherein an imbalance due to the pressure unit would have to be compensated by an equal weight on the opposite side of the wheel. Greater protection from mechanical abuse is also afforded in this location.

Figure 10:
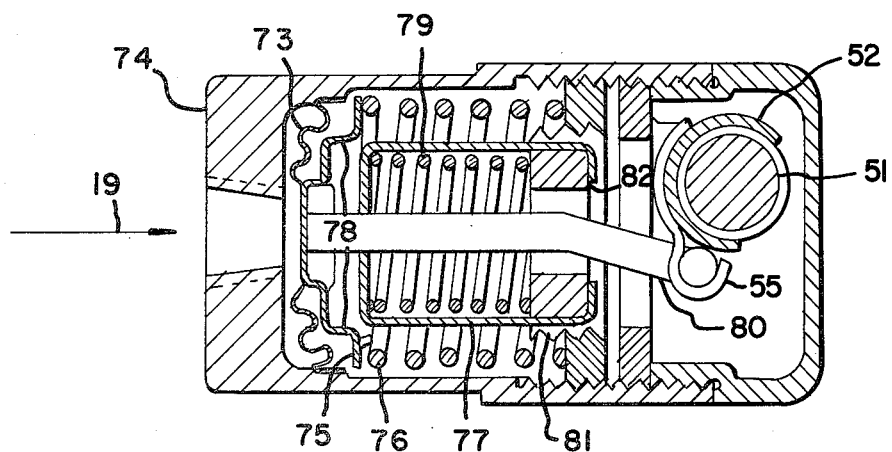
FIG. 10 shows a modification using a primary and a secondary spring instead of the double diaphragm as the pressure sensor.

An embodiment of the pressure sensor which uses a metallic diaphragm and two coaxial springs to obtain a dead band is shown in FIG. 10. The diaphragm 73 is formed of a bronze or similar thin metal and soldered or brazed into housing 74 to form a closed cavity for tire pressure admitted through inlet port 19. If greater stroke is required a metallic bellows may be substituted for the diaphragm shown. The diaphragm 73 contacts the piston 75 which is biased toward the pressure source by primary spring 76. This spring is designed to have sufficient force to balance the pressure load at the low end of the satisfactory pressure range. At that point in the stroke of the diaphragm and piston the casing 77 of a preloaded spring capsule is contacted by the piston which has a recess 78 within which the casing will fit. The spring capsule contains the secondary spring 79 which is preloaded and restrained by casing 77 at a load sufficient to prevent motion of the piston until tire pressure exceeds the top limit of the satisfactory pressure range. At that point, the air pressure load overpowers both springs which deflect allowing the piston to move piston rod 80 and rotate the bar magnet 51 and its shield 52 by means of clip 55. During this motion casing 77 slides through slots 81 in the threaded retainer 82 as spring 79 deflects. Operation of the permanent magnet and shield in generating signals corresponding to the respective pressure sensor positions is the same as described previously. In variations of this embodiment different type springs may be used to provide the primary and secondary spring forces. A bellows of proper stroke and spring rate may be substituted for the metallic diaphragm and the primary spring. An elastomeric diaphragm as in FIG. 6 may be used rather than the metallic diaphragm.

Shown in FIG. 11 is an embodiment which provides both rotation and translation of the permanent magnet as well as a portion of the magnetic shield. A pressure sensor as shown in FIG. 3 operates bellcrank 87 on each side of the case through a yoke 86 provided to clear the magnet 28 and attached to the bellcrank 87 at point A. The bellcranks are pivoted on and supported at point B by brackets 89 attached to the case and operate both the magnet and a movable portion 83 of the magnetic shield. Fixed portions of the shield are located above, 85a, and below 85b, the mechanism and may be used in other locations as necessary to shield the magnet. In FIG. 11A, a section taken at the center of the actuator 88 and mechanism, the actuator is in the position of high pressure and the magnet 28 is directed at one coil 34 of the magnetic sensor 35 while the shield is positioned in front of the other coil 33. The magnet is supported on side beams 90 which are connected by slots at point C to brackets 91 on each side of the actuator housing. The side beams are connected to the bellcrank 87 at point D for operation. In FIG. 11B, equivalent to normal pressure in the pressure sensor, the bellcrank 87 has rotated to the position of satisfactory pressure and has rotated magnet 28 on its side beams 90 and retracted it to a position directly behind the magnetic shield portion 83 which has swung into place directly in line with the midpoint between the magnetic coils 33 and 34 on the non-rotating portion of the vehicle.

The shield portion 83 is operated by pins in the bell-cranks 87 at point E operating in slots in the side extensions of the shield portion which are attached at and rotate about point C of bracket 91. In FIG. 11C, equivalent to low pressure in the pressure sensor, the shield portion 83 has moved up and the magnet 28 has moved down and extended toward the lower of the two magnetic sensors 33, thereby providing a maximum flux and signal to that sensor. In FIG. 11B, the two sensors receive an equal but minimum flux while in FIG. 11A the upper sensor receives the maximum flux.

These different signals are interpreted by the logic, as noted previously, to display corresponding signals to the vehicle operator. This embodiment provides a means to retract the magnet as well as shielding it to minimize the signal at the satisfactory pressure position and to extend the magnet for high and low pressure conditions to maximize the signal to the magnetic sensors.

Other types of pressure sensors which provide a dead band in travel over the range of satisfactory pressures may be used. Among such approaches are shaped metal diaphragms and metal bellows to provide both diaphragm and spring action. Any mechanism having a slotted connection such as between the actuator piston rod and the magnetic signal generator may be used to provide a dead band equivalent to the range of satisfactory pressure. If a slotted hole is used, a detent may be used or a spring may be provided to locate the magnetic signal generator unit at its center position until it is moved therefrom by the pressure sensor. Another mechanism to obtain a dead band is a single spring pressure actuator driving a magnetic signal generator spring biased to stay in its central or satisfactory pressure condition by preloaded springs. The rolling diaphragm with a two-effective-diameter actuator provides a simple, compact design easy to analyze, with low friction and minimum number of parts. The diaphragm may be made of a fabric such as dacron impregnated with an elastomer for airtight integrity. A high temperature elastomer such as silicone rubber is preferable since the pressure unit operates in the area of the brakes and may be subjected to high temperatures.

The cylinder and piston of the actuator may be made of metallic castings, preferably non-ferrous, or machined from bar stock. They also may be molded of rigid plastics for light weight and high production. The helical spring shown may be modified to provide a sensor for different pressures. Precise adjustment for manfacturing tolerances is provided by the end cap of the actuator. A spring clip attaches the actuator piston rod to the magnetic signal generator.

Other devices which are sensitive to the intensity of a moving magnetic field may be substituted for the coils in the sensor unit on the non-rotating portion of the vehicle as described previously herein. Magnetic switches may be used as shown in FIG. 7 by designing the windows on the magnetic shield so that the switches are selectively exposed to and shielded from a magnetic field of sufficient intensity to close the switches at the appropriate positions in the pressure sensor stroke. Magnetic switches may be a lower cost sensor and lead to greatly simplified electronic logic but may not be as reliable as coils which have no moving parts. Additionally, the circuits could not be checked for continuity with the switches open. Solid state components such as transistors designed to change resistance when exposed to a magnetic field may be used in place of the coils and will perform essentially the same system function. While coils have been used to illustrate the embodiments noted herein any other magnetic sensor performing the same or an equivalent function may be used on the invention within the definition of the claims.

Alternative presentations of the tire pressure information to the vehicle operator in addition to that shown in FIG. 1 may be utilized according to the needs of the vehicle operator and the economic advantages. The check function to indicate system readiness could be added by the addition of a monitor cycle switch and appropriate circuitry, or the checking cycle could be made automatic when the monitor is turned on.

A more sophisticated embodiment of the display panel would make use of the varying ratio between the signals of the two sensors to provide marginal malfunction signals as well as the normal and dangerous pressure signals. In addition to the wheel indicator and monitor cycle switch this display shows signals in descending order on the panel as follows:

dangerous high pressure
marginal high pressure
normal pressure
marginal low pressure
dangerous low pressure This embodiment is of most value on complex vehicles such as commercial aircraft where emergency decisions must often be made on the basis of incomplete information. Another embodiment which gives complete pressure information includes a dial calibrated in pressure units, e.g., pounds per square inch, to be used on the display panel. The dial indicator can be calibrated to correspond to the position of the pressure sensor unit and its input pressure. In this embodiment, a pressure sensor without a dead band in the pressure/stroke relationship may be used in order to provide a continuous change in the magnetic field falling on the two magnetic sensors. By a comparison of the two magnetic sensor outputs using integrated circuits, the dial indicator on the display panel shows an infinitely variable pressure.

A partial schematic of the connections between the various system components is shown in FIG. 12. Two wheel sensors 15 and 15a are shown together with wiring 67-70 from as many others as may be desired. The unit containing the electronic logic may be combined with the display panel or may be located at any position on the vehicle which may be more convenient. The magnetic sensor unit at each wheel requires two wires to the logic as well as a ground to the vehicle frame for the two devices responsive to the magnetic field.

While particular embodiments of the invention have been shown and described, it will be understood that various modifications may be made without departing from the true spirit of the invention. The appended claims, are, therefore, intended to cover all such modifications.

What is claimed is:

1. A system for monitoring a source of tire pressure on a vehicle to provide substantially no signal change within a predetermined range of satisfactory tire operating pressure, a rapidly changing signal when tire pressure falls below said pressure range and a different rapidly changing signal when tire pressure exceeds said pressure range comprising:

a pressure responsive actuator having a movable member, means for moving said member rapidly toward said source of said tire pressure when said pressure falls below said range and to move rapidly away from said source when said pressure exceeds said range, said last named means having a dead band of substantially no movement when said pressure is within said predetermined range of satisfactory tire operating pressure, biasing means urging said member toward said source of said tire pressure, sensing means for sensing the rapid movement of said member and the direction of said movement, said sensing means having an output, and means for displaying the output of said sensing means to the operator of said vehicle.

2. The system recited in claim 1 wherein said movable member is moved solely by said tire pressure and said biasing means, and wherein the movement is automatically reversible for repetitive operation without manual resetting or adjustment.

3. The system recited in claim 2 wherein said means for moving said member comprises:

a cylinder, a piston operating in said cylinder and biased in the direction of said source, said piston having two different diameters disposed towards the source of said pressure, and a rolling diaphragm located between said source and said piston such that when the diaphragm is contacting said piston only over the smaller of said diameters, a smaller effective area will be presented in opposition to said pressure when the diaphragm is contacting said piston over the larger of said diameters, a larger effective area will be presented in opposition to said pressure and such that when the diaphragm first contacts said larger of said diameters, the piston will not be forced to move substantially in either direction over a broad range of varying pressure.

4. The system recited in claim 2 wherein the means for moving said member comprises:

a cylinder having two different and contiguous diameters, and a rolling diaphragm which presents a larger effective area to tire pressure when it is operating in the large diameter of the cylinder and a smaller effective area when operating in the smaller diameter of the cylinder, so that when the rolling diaphragm is at the juncture of the two diameters, the diaphragm and movable member in contact therewith will not be forced to move substantially in either direction over a broad range of varying pressure.

5. The system recited in claim 1 wherein said range of varying pressure has high and low pressure limits which correspond substantially to the range of desired operating pressure, said means for moving operating at substantially the high and low pressure limits of satisfactory operation of the tire being monitored.

6. The system recited in claim 1 wherein said biasing means includes primary and secondary biasing elements, said primary biasing element contacting said member to urge it toward said pressure source, said secondary biasing element being positioned so that it is contacted by said member only when said pressure is within said operating range or higher than said operating range, said secondary biasing element having a preload such that said member after contact with said secondary biasing element is moved rapidly away from said pressure source only when said pressure exceeds said range.

7. The system recited in claim 1 wherein said biasing means includes a flat leaf spring disposed laterally with respect to said movable member.

8. The system recited in claim 1 wherein said means for moving has two effective diameters presenting two different effective areas which are exposed to said tire pressure as said actuator moves.

9. A system for monitoring the condition of tire pressure on a vehicle having a rotating wheel, a nonrotating portion, and a vehicle operator's station comprising:

a pressure sensitive actuator mounted on the wheel of said vehicle, magnetic signal generating means connected to be operated by said pressure sensitive actuator, said signal generating means including a permanent magnet disposed to project a magnetic field, the position of said magnetic field projecting toward the nonrotating portion of said vehicle, said magnetic signal generating means being operated by said pressure sensitive actuator for adjusting the position of said magnetic field, a shield of ferromagnetic material located to shield said permanent magnet from the effects of adjacent ferrous materials and from random magnetic influences from substantially all directions except in the direction of the nonrotating portion of the vehicle, said shield having a window opening to permit passage therethrough of a magnetic field toward said nonrotating portion, a plurality of magnetic sensors mounted on the nonrotating portion of the vehicle for detecting said magnetic field, said sensors each producing an output having a component dependent on the location of said magnetic field, said magnetic sensors being positioned so that said component is different for different sensors, electronic means connected to said magnetic sensors to analyze the signals received by said sensors, and means responsive to said electronic means for displaying said condition of said tire pressure at the vehicle operator's station.

10. The system recited in claim 9 wherein aid magnetic shield around said permanent magnet is static with respect to said wheel on which it is mounted and said permanent magnet is moved by the pressure sensitive actuator to change the magnetic field falling on the magnetic sensor.

11. The system recited in claim 9 wherein said magnetic shield around said permanent magnet is pivoted on an axis substantially perpendicular to a plane including the axis of rotation of the wheel and said magnet is fixed with respect to the wheel on which it is mounted wherein said magnetic signal generating means includes means for adjusting the direction of said magnetic field and wherein said means for adjusting the direction of said magnetic field is a connection between said actuator and said shield.

12. The system recited in claim 9 further comprising:

balance weights for dynamically balancing said magnetic signal generating means to avoid the effects of centrifugal force due to the rotating wheel.

13. The system recited in claim 9 wherein said plurality of magnetic sensors mounted on the nonrotating portion of the vehicle comprises a plurality of elements responsive to a magnetic field including at least two of said elements on a radial line at different distances from the axis of rotation of said wheel.

14. The system recited in claim 9 wherein said magnetic field falling on said magnetic sensors is maximized at the position of the pressure sensitive actuator corresponding to satisfactory tire pressure.

15. The system recited in claim 14 wherein motion of said pressure sensitive actuator and said magnetic signal generating means in either direction causes the magnetic field falling on said plurality of magnetic sensors to be decreased.

16. The system recited in claim 9 wherein said magnetic field falling on said magnetic sensors is minimized at the position of the pressure sensitive actuator corresponding to satisfactory tire pressure.

17. The system recited in claim 16 wherein motion of said pressure sensitive actuator and said magnetic signal generating means in either direction causes said magnetic field falling on said plurality of magnetic sensors to be increased.

18. A system for transferring signals from a rotating body on a machine having a nonrotating portion comprising:
permanent magnet means on the rotating body for generating a magnetic field with a position dependent on conditions on said rotating body, and
a plurality of magnetic sensors positioned a discrete distance apart on said non-rotating portion of the machine, said sensors each producing an output having a component dependent on the location of the field of said signal, said magnetic sensors being positioned so that said component is different for different sensors,
means responsive to the outputs of said sensors to sense changes in said position of said magnetic field.

19. A system as described in claim 18 for automatically monitoring tire pressure on a vehicle wherein said magnetic field is adjusted in strength and position to correspond with said tire pressure.

20. A system as described in claim 18 wherein said permanent magnet means is a permanent magnet mounted on said rotating body and so disposed as to project a magnetic field toward said magnetic sensors on the non-rotating portion of the machine.

21. The system recited in claim 18 wherein at least two of said magnetic sensors are disposed along the same radial line at different distances from the axis of rotation of said rotating body.

22. The system recited in claim 18 wherein said sensors produce an output having another component dependent on the rotational speed of said body, the output of said sensors being connected so that said component which varies with rotational speed is canceled, said means responsive to the outputs of said sensors further comprising means for comparing the values of the magnetic field received by said magnetic sensors, means for analyzing said signals to determine the conditions of the permanent magnet means and means for displaying said conditions.

23. The system recited in claim 21 wherein said magnetic sensors are electromagnetic coils which generate a voltage by exposure to a moving magnetic field.

24. The system recited in claim 21 wherein said magnetic sensors are magnetic switches which are actuated by exposure to a magnetic field.

25. The system recited in claim 20 including a shield of ferromagnetic material located to shield said permanent magnet from the effects of adjacent ferrous materials and from random magnetic influences from substantially all directions except in the direction of the nonrotating portion of the vehicle, said shield having a window opening to permit passage therethrough of a magnetic field toward said non-rotating portion.

26. The system recited in claim 18 further comprising an operator's station including circuitry connected to said plurality of magnetic sensors positioned to monitor a plurality of rotating bodies, and indicators connected to said circuitry for displaying the conditions of said plurality of rotating bodies.

27. The system recited in claim 18 wherein said permanent magnet means comprises:
a pressure sensor mounted on a wheel of a vehicle, and
a shield of ferromagnetic material connected to be moved by said pressure sensor, said shield having a window opening for changing the direction of a magnetic field passing therethrough as said shield moves.

28. The system recited in claim 18 for automatically monitoring a source of tire pressure on a vehicle wherein said signals indicate whether said tire pressure is within a predetermined range of satisfactory tire operating pressure further comprising:
a movable member, biasing means urging said member toward the source of said tire pressure, and
a pressure responsive element positioned to move said member rapidly toward said source when said pressure falls below said range and to move said member rapidly away from said source when said pressure exceeds said range, and wherein said magnetic field generating means is connected to said movable member for changing said position of said magnetic field.

29. A system for monitoring the condition of tire pressure on a vehicle having a rotating wheel, a non-rotating portion, and an operator's station comprising:
a pressure sensitive actuator adapted to be mounted on the wheel of said vehicle,
magnetic signal generating means connected to be operated by said pressure sensitive actuator, said signal generating means including a permanent magnet disposed to project a magnetic field having a position which projects toward the non-rotating portion of said vehicle,
said magnetic signal generating means being operated by said pressure sensitive actuator for adjusting the position of said magnetic field,
a shield of ferromagnetic material located to shield said permanent magnet from the effects of adjacent ferrous materials and from random magnetic influences from substantially all directions except in the direction of the non-rotating portion of the vehicle, said shield having a window opening to permit passage therethrough of a magnetic field toward said non-rotating portion,
a magnetic sensor mounted on the non-rotating portion of the vehicle for detecting said magnetic field,
a shield of ferromagnetic material surrounding said magnetic sensor in substantially all directions except in the direction disposed toward said permanent magnet,
electronic means connected to said magnetic sensor to analyze the signals received by said sensor, and
means responsive to said electronic means for displaying said condition of said pressure of said tire at the vehicle operator's station.

* * * * *

UNITED STATES PATENT AND TRADEMARK OFFICE
CERTIFICATE OF CORRECTION

PATENT NO. : 4,157,530
DATED : June 5, 1979
INVENTOR(S) : Ernest J. Merz

It is certified that error appears in the above-identified patent and that said Letters Patent are hereby corrected as shown below:

Col. 2, line 50, after "another" insert therefor --object--.

Signed and Sealed this

Twentieth Day of November 1979

[SEAL]

Attest:

RUTH C. MASON
Attesting Officer

LUTRELLE F. PARKER
Acting Commissioner of Patents and Trademarks